(12) United States Patent
Nawa et al.

(10) Patent No.: US 8,077,806 B2
(45) Date of Patent: Dec. 13, 2011

(54) WIRELESS RECEPTION DEVICE AUTOMATICALLY ESTABLISHING FREQUENCY SYNCHRONIZATION OR PHASE SYNCHRONIZATION

(75) Inventors: Toshihiko Nawa, Yokohama (JP); Takeshi Inoue, Yokohama (JP); Keitaro Otsuka, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 732 days.

(21) Appl. No.: 11/137,563

(22) Filed: May 26, 2005

(65) Prior Publication Data

US 2006/0171487 A1   Aug. 3, 2006

(30) Foreign Application Priority Data

Feb. 1, 2005   (JP) .................................. 2005-025300

(51) Int. Cl.
*H04L 27/00* (2006.01)
(52) U.S. Cl. ........................................ 375/326; 327/156
(58) Field of Classification Search .................. 375/326; 327/154
See application file for complete search history.

(56) References Cited

U.S. PATENT DOCUMENTS

| | | | | |
|---|---|---|---|---|
| 5,440,587 A * | 8/1995 | Ishikawa et al. | ............... | 375/332 |
| 5,881,099 A * | 3/1999 | Takahashi et al. | ............ | 375/141 |
| 6,023,491 A * | 2/2000 | Saka et al. | ..................... | 375/326 |
| 6,310,924 B1 * | 10/2001 | Kang et al. | ..................... | 375/326 |
| 6,920,189 B1 * | 7/2005 | Spalink | ......................... | 375/326 |
| 2005/0089120 A1 * | 4/2005 | Quinlan et al. | ............... | 375/335 |

FOREIGN PATENT DOCUMENTS

| | | |
|---|---|---|
| JP | 6-244820 | 9/1994 |
| JP | 2002-237767 | 8/2002 |

* cited by examiner

*Primary Examiner* — David C. Payne
*Assistant Examiner* — Tanmay Shah
(74) *Attorney, Agent, or Firm* — Arent Fox, LLP

(57) ABSTRACT

The wireless reception device has automatic frequency control unit for detecting, from a reception modulation signal frequency-converted to the baseband, a frequency deviation component of a carrier wave between transmission and reception sides that is contained in the reception modulation signal and removing the frequency deviation component from the reception modulation signal, the automatic frequency control unit having a frequency locking operation state and a steady state following the frequency locking operation. The wireless reception device further has modulation component removal unit for generating a synchronization detection reference signal by removing the modulation component of the received modulation signal; and match detection unit that detects a mismatch between the synchronization detection reference signal and the frequency deviation component detected by the automatic frequency control unit, wherein, when the match detection unit detects the mismatch, the automatic frequency control unit are controlled to the frequency locking operation state.

19 Claims, 13 Drawing Sheets

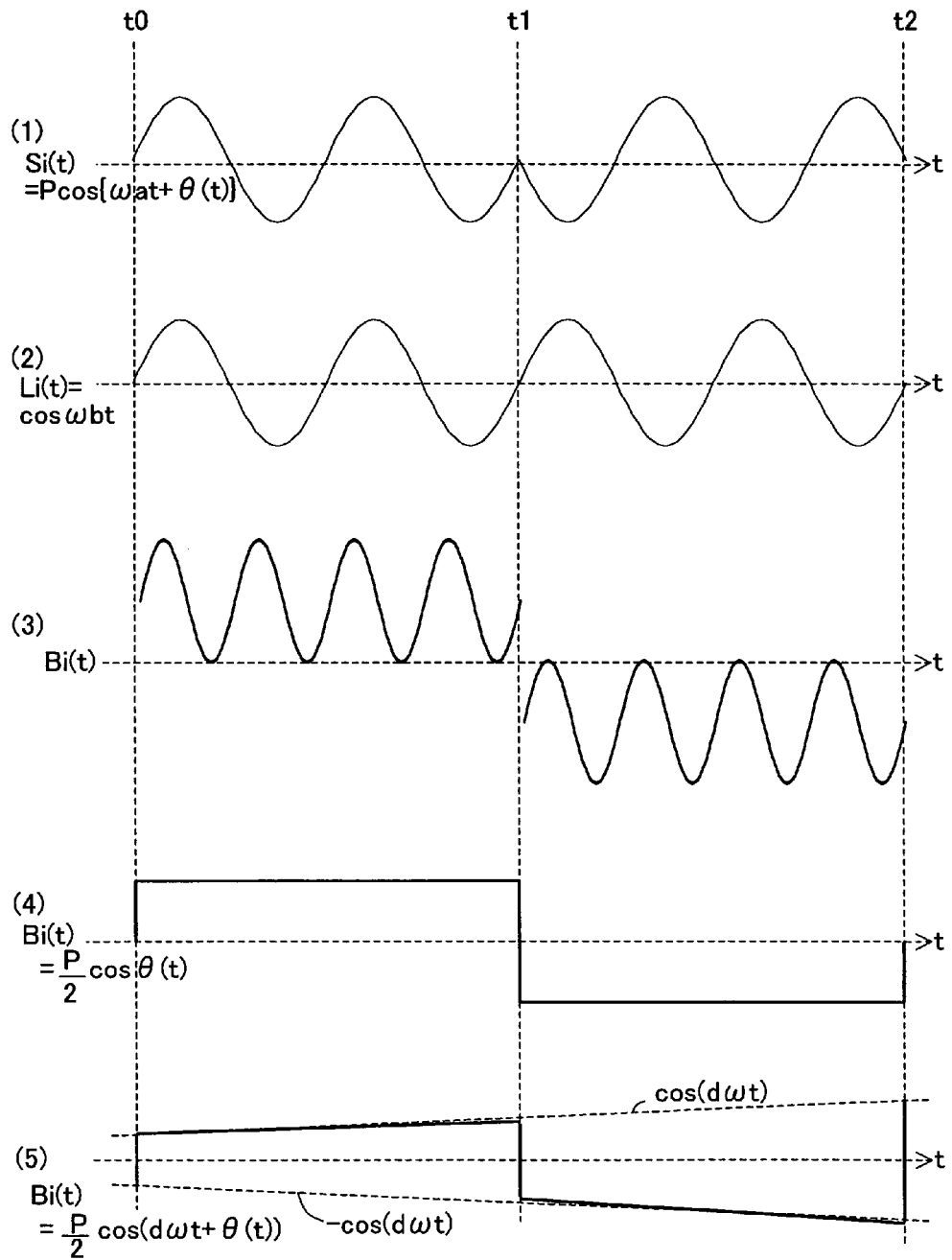

WIRELESS RECEPTION DEVICE AUTOMATICALLY ESTABLISHING FREQUENCY SYNCHRONIZATION OR PHASE SYNCHRONIZATION

CROSS-REFERENCE TO RELATED APPLICATIONS

This application is based upon and claims the benefit of priority from the prior Japanese Patent Application No. 2005-25300, filed on Feb. 1, 2005, the entire contents of which are incorporated herein by reference.

BACKGROUND OF THE INVENTION

1. Field of the Invention

The present invention relates to a wireless reception device that is used in wireless communications such as mobile communications, cellular phones, satellite communications, microwave relay devices and which automatically establishes frequency synchronization or phase synchronization and, more particularly, to a wireless reception device which detects a synchronous and asynchronous state of an automatic frequency control circuit for controlling the frequency synchronization or the synchronous and asynchronous state of a carrier recovery circuit that controls phase synchronization and which establishes a synchronous state automatically in the event of an asynchronous state.

2. Description of the Related Art

It is known that, in a wireless communication device, a deviation exists between the frequency on the transmission device side and the frequency on the reception device side and that there is degradation of the bit error rate (BER) due to the effect of this frequency deviation. Therefore, a demodulation device on the reception side removes the frequency deviation between transmission and reception by means of an automatic frequency control (AFC: Automatic Frequency Controller) circuit. Further, a phase error or phase shift similarly exists between the transmission and reception sides and the demodulation device removes this phase error by means of a carrier recovery circuit or the like.

This method of removing the frequency deviation appears in Japanese Patent Application Laid Open Nos. H6-244820 and 2002-237767, for example. These patent documents describe a method that resolves the difficulty of frequency synchronization pertaining to a case where a code division multiple access (CDMA) system is used.

An AFC circuit constitutes an AFC loop comprising a phase rotation device, a frequency discriminator, and a voltage control oscillator, wherein the frequency discriminator finds the frequency deviation component from a received modulation signal that has been frequency-converted to the baseband, the voltage control oscillator (VCO) generates an AFC reference signal with a frequency corresponding to the frequency deviation component, and the phase rotation device removes the frequency deviation component by performing phase rotation corresponding with the frequency deviation from the reception modulation signal by using an AFC reference signal.

A variety of noise and interference signals, and so forth, exist in the wireless transmission channel and the frequency synchronization of the AFC circuit is sometimes off as a result of the effect of the noise and interference signals. More particularly, in the case of mobile communications and cellular phones and so forth, blocking of sudden signals caused by a cover structure is produced and the synchronization of the AFC circuit is readily off. Further, because very weak electric waves are used in satellite mobile communications and so forth, there are frequent cases where recovery to a synchronous state is difficult once the synchronization of the AFC circuit is off.

Generally, in a fixed period from the time an arriving electrical power is detected, the AFC loop performs a locking operation for the frequency caused by the recovery control operation and removes the frequency deviation so as to establish frequency synchronization. During the locking operation, the frequency band is widened so that the locking of the frequency is rendered simple and, once locking is complete, the frequency band is narrowed to establish a steady state and the stabilized locking state (synchronous state) is maintained. The switch from the initial locking state to the steady state after synchronization has been established is performed with timing that counts a fixed time determined beforehand after detecting the arrival of reception waves.

SUMMARY OF THE INVENTION

However, in the case of a conventional AFC circuit, there is a possibility of failure in the locking of the frequency. This is because an obstacle to the locking operation in a predetermined period is sometimes produced as a result of noise and so forth during locking. If the reception signal is blocked again and the arriving electrical power can be detected, the locking operation can be performed by controlling the AFC circuit to the locking state. However, in cases where a phenomenon in which the start of the AFC operation is triggered is not occurred after failure in the locking operation does not occur, for example, the reception signal is not blocked, frequency synchronization can no longer be established.

The carrier recovery circuit that removes the phase error also has a feedback loop constitution like that of an AFC circuit and, in the initial locking operation, the bandwidth is widened and, once locking is complete, the bandwidth is narrowed to be controlled to a stabilized state. Therefore, the carrier recovery circuit for establishing phase synchronization is also confronted by the problem of no longer being able to establish phase synchronization as in the case of the AFC circuit.

It is therefore an object of the present invention to provide a wireless reception device that is able to detect the synchronous and asynchronous states of an automatic frequency control circuit that controls frequency synchronization and to automatically establish synchronization in the event of an asynchronous state.

Further, yet another object of the present invention is to provide wireless reception device that is able to detect the synchronous and asynchronous states of a carrier recovery circuit that controls the phase synchronization and to automatically establish synchronization in the event of an asynchronous state.

In order to achieve the above object, in a first aspect of the present invention, the wireless reception device comprises automatic frequency control unit for detecting, from a reception modulation signal that has been frequency-converted to the baseband, a frequency deviation component of a carrier wave between the transmission side and reception side that is contained in the reception modulation signal and removing the frequency deviation component from the reception modulation signal, the automatic frequency control unit having a frequency locking operation state and a steady state following the frequency locking operation. The wireless reception device further comprises modulation component removal unit for generating a synchronization detection reference signal by removing the modulation component of the received modulation signal; and match detection unit that detects a mismatch between the synchronization detection reference signal and the frequency deviation component detected by the automatic frequency control unit, wherein, when the match detection unit detects the mismatch, the automatic frequency control unit are controlled to the frequency locking operation state.

According to the first aspect of the present invention, in a preferred embodiment, the modulation component removal unit generates the synchronization detection reference signal by removing a modulation component corresponding to known information from a reception modulation signal that contains the known information. More preferably, the modulation generation removal unit rotates the phase of the reception modulation signal containing the known information on the basis of a known information signal containing the known information. A reception modulation signal containing known information is a signal that is already known of the header part of each frame or a pilot signal, or the like, for example. The known information signal can be generated on the reception side because of the known information and, by rotating the phase of the reception modulation signal containing the known information in accordance with the phase of the known information signal, a synchronization detection reference signal from which the modulation component has been removed can be generated.

In a more preferable embodiment for the above embodiment, a reception modulation signal that has been frequency-converted to the baseband undergoes digital conversion and the modulation component removal unit generates a sign bit of the synchronous detection reference signal from a sign bit of the digital reception modulation signal and a sign bit of a digital known information signal. Further, the match detection unit detects a mismatch between the sign bit of the synchronous detection reference signal and the sign bit of the frequency deviation component detected by the automatic frequency control unit. Because the synchronization detection reference signal is generated by using the sign bits instead of the information bits in the digital signal and a match or mismatch is detected, it is possible to reduce the circuit scale of the modulation component removal unit and the match detection unit.

In order to achieve the above object, in a second aspect of the present invention, the wireless reception device comprise carrier recovery unit for detecting, from a reception modulation signal that has been frequency-converted to the baseband, a phase error component of a carrier wave between the transmission side and reception side that is contained in the reception modulation signal and for removing the phase error component from the reception modulation signal, the carrier recovery unit having a phase locking operation state and a steady state following the phase locking operation. The wireless reception device further comprises modulation component removal unit for generating a synchronization detection reference signal by removing the modulation component of the reception modulation signal; and match detection unit that detects a mismatch between the synchronization detection reference signal and the phase error component detected by the carrier recovery unit, wherein, when the match detection unit detects the mismatch, the carrier recovery unit are controlled to the phase locking operation state.

So too in the case of the second aspect, in a preferred embodiment, the modulation component removal unit and match detection unit are the same as the preferred embodiment of the first aspect of the present invention.

According to the first aspect of the present invention, the method for detecting the frequency synchronization and asynchronous states utilizes the fact that, when the automatic frequency control unit are in the synchronous state, the detected frequency deviation component matches the frequency deviation component contained in the actual reception modulation signal. That is, in a steady state, the synchronization detection reference signal (signal including the frequency deviation component) generated by the modulation component removal unit and the frequency deviation component detected by the automatic frequency control unit are compared in a steady state and it is detected whether the automatic frequency control unit are in a synchronous state or asynchronous state. Further, when a mismatch is detected, the automatic frequency control unit are controlled to the frequency locking state, the frequency locking operation is executed, and the reception device can be restored to the frequency synchronous state.

According to the second aspect of the present invention, the method for detecting the phase synchronization and asynchronous states utilizes the fact that, when the carrier recovery means are in the synchronous state, the detected phase deviation component matches the phase deviation component contained in the actual reception modulation signal, similarly to above. That is, in a steady state, the synchronization detection reference signal (signal including the frequency deviation component) and the phase deviation component detected by the carrier recovery unit are compared and it is detected whether the carrier recovery unit are in a synchronous state or asynchronous state. Further, when a mismatch is detected, the carrier recovery unit are controlled to the frequency locking state, phase locking is executed, and the reception device can be restored to the phase synchronization state.

BRIEF DESCRIPTION OF THE DRAWINGS

FIG. 2 illustrates the quadrature component of the reception signal;

Embodiments of the present invention will be described hereinbelow with reference to the drawings. However, the technological scope of the present invention is not limited to these embodiments and covers the items appearing on the claims and any equivalents thereof.

DESCRIPTION OF THE PREFERRED EMBODIMENTS

Figure 1:
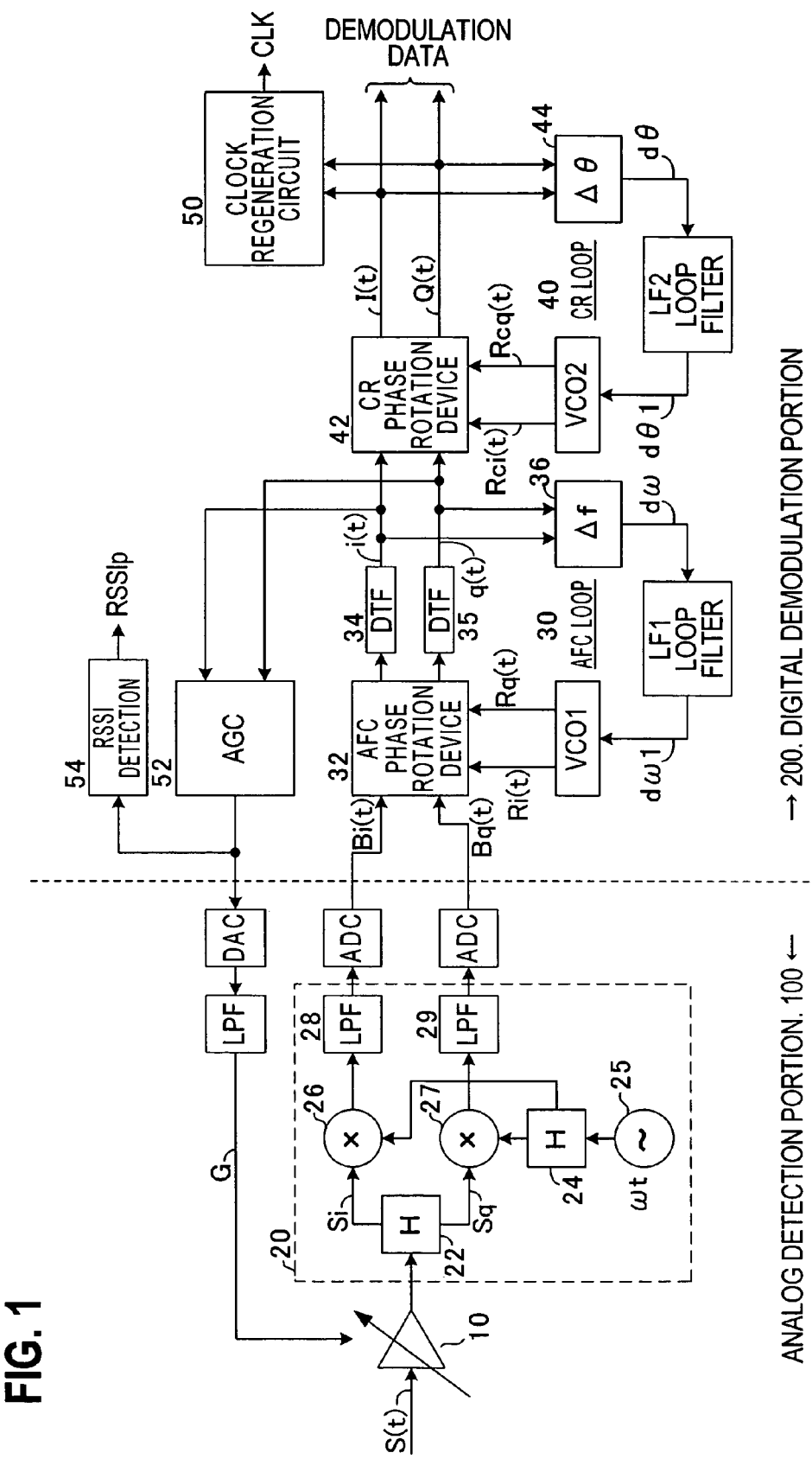
FIG. 1 is a schematic constitutional view of the wireless reception device of this embodiment.

FIG. 1 is a schematic constitutional view of the wireless reception device of this embodiment. FIG. 1 shows an analog wave detection portion 100 and a digital demodulation portion 200. A reception signal S (t) that is received by an antenna (not shown) is supplied via a bandpass filter (not shown) and an automatic gain controller 10 and subjected to quadrature detection by a quadrature wave detector 20. The quadrature wave detector 20 comprises a reception signal divider 22 that divides the reception signal S (t) into an in-phase component I-channel signal Si and a quadrature-component Q-channel signal Sq, a reception-side local emitter 25; a phase divider 24 that divides a sine wave or cosine wave of a local frequency $\omega$ generated by the local oscillator 25 into an $\pi/2$ phase, multipliers 26 and 27 that multiply the signals Si and Sq of the I and Q channels respectively by the cosine wave and sine wave of the local frequency $\omega$, and a lowpass filter LPF that removes the high frequency component of the output signal of the multiplier. The local frequency $\omega$ is set up to the same as the carrier frequency when the input signal S (t) of the quadrature wave detector 20 has the carrier wave frequency or is set up to the same as the intermediate frequency when the input signal S (t) has been frequency-converted to the intermediate frequency. Further, each of the detected signals is digitized by an AD converter ADC and supplied to the digital demodulator 200 as the I channel signal Bi (t) and Q channel signal Bq (t).

FIG. 2 illustrates quadrature detection of the reception signal. FIG. 2 shows a BPSK example in which the reception signal S (t), in which binary data 1, 0 is phase-modulated by the carrier frequency $\omega a$, is detected by the reception-side local frequency $\omega b$ and frequency-converted. The carrier wave frequency (or intermediate frequency) $\omega a$ and reception-side local frequency $\omega b$ are substantially the same frequency. The reception signal S(t) has as explained later the carrier wave frequency $\omega a$ and phase $\theta$ (t) of the modulation signal. P is the amplitude.

$$S(t) = P \cos\{\omega at + \theta(t)\} \tag{10}$$

As shown in (1) in FIG. 2, the reception signal Si (t) is phase-modulated with respect to a positive phase at time t0–t1 and at a negative phase at time t1–t2.

The signal of the local oscillator of the quadrature wave detector shown in FIG. 2(2) is as follows. However, only Li (t) is shown in FIG. 2(2).

$$Li(t) = \cos \omega bt \tag{11}$$

$$Lq(t) = \sin \omega bt \tag{12}$$

Therefore, the detection wave output of the multiplier 26 on the I-channel side is as per the following equation that is rendered by multiplying Equation (10) by Equation (11). In this case, it is assumed that $\omega a = \omega b$ and the waveform example is shown in FIG. 2(3).

$$Bi(t) = P[\cos \theta(t)/2 + \{\cos 2\omega bt \cos \theta(t)/2\} - \{\sin 2\omega bt \sin \theta(t)/2\}]$$

Further, the high frequency of the second and subsequent items in this equation is removed by the lowpass filter LPF in the quadrature wave detector 20 and, therefore, the quadrature wave detection output Bi (t) is as follows. Further, the quadrature wave detection output Bq (t) is similarly as follows. The waveform example is shown in FIG. 2(4). However, as a result of BPSK, the phase $\theta(t)$ of the modulation signal is $\theta(t) = D(t)^*\pi$ (modulation data D (t) is 0 or 1).

$$Bi(t) = (P/2)\cos \theta(t) \tag{13}$$

$$Bq(t) = (P/2)\sin \theta(t) \tag{14}$$

where, in cases where there is no match at all between the carrier frequency $\omega a$ and the local frequency $\omega b$, the phase component of the frequency deviation $d\omega (=\omega a - \omega b)$ remains in the detected output signal in Equations (13) and (14), that is, as per the following equations. Further, the waveform is shown in FIG. 2(5).

$$Bi(t) = (P/2)\cos[d\omega t + \theta(t)] \tag{13a}$$

$$Bq(t) = (P/2)\sin[d\omega t + \theta(t)] \tag{14a}$$

As is clear from the above computation and the waveform diagram in FIG. 2, when there is a match between the carrier frequency $\omega a$ of the reception signal S (t) inputted to the quadrature wave detector 20 and the reception-side local frequency $\omega b$, the carrier frequency is completely removed by the frequency conversion of the quadrature detection wave and the detected output signals Bi and Bq are then in the range of the baseband as per FIG. 2(4). On the other hand, when there is a frequency deviation $d\omega$ between the carrier frequency $\omega a$ and local frequency $\omega b$, the detected output signals Bi and Bq contain a frequency deviation component $d\omega$ per FIG. 2(5) and the envelope of the output signal matches $\cos(d\omega t)$ and $-\cos(d\omega t)$. That is, a beat signal corresponding to a frequency deviation remains in the reception modulation signals Bi(t) and Bq(t) following quadrature detection.

Further, in an example where the phase $\theta(t)$ of the modulation signal is a QPSK phase, $\theta(t) = D(t)^*(\pi/2) + \pi/4$ (D (t) is modulation data (0, 1, 2, 3))

and, accordingly, substituting same into the equations (13a) and (14a), $$Bi(t) = (P/2)\cos[d\omega t + D(t)^*(\pi/2) + \pi/4] \tag{13b}$$

$$Bq(t) = (P/2)\sin[d\omega t + D(t)^*(\pi/2) + \pi/4] \tag{14b}$$

Further, the phase $\theta(t)$ of the modulation signal is, in a BPSK example, $\theta(t) = D(t)^*\pi$ (D(t) is modulation data (0,1).

Substituting this into equations (13a) and (14a), the detected output signals Bi(t) and (Bq(t) are expressed as follows.

$$Bi(t) = (P/2)\cos[d\omega t + D(t)^*\pi] \tag{13c}$$

$$Bq(t) = (P/2)\sin[d\omega t + D(t)^*\pi] \tag{14c}$$

In this case, if $d\omega t = 0$, because this is a BPSK phase, Bq(t) =0.

In either a QPSK or BPSK case, a frequency deviation component $d\omega t$ and modulation component $\theta$ (t) are contained in the detected output signals Bi(t) and Bq (t). That is, the beat signal of the frequency deviation $d\omega t$ is contained in the modulation component.

Returning now to FIG. 1, the digital demodulation portion 200 demodulates, by means of a predetermined modulation system, the reception modulation signals Bi (t) and Bq (t) that have been down-converted to the base band range by the quadrature detection. For example, if code spreading is performed, the reception modulation signals Bi (t) and Bq (t) are demodulated to the original signal on the basis of spreading code and demodulated to the original signal by linking code that is divided for quadrature modulation. However, before performing this signal processing, the frequency deviation $d\omega$ component must be removed from the inputted reception modulation signals Bi(t) and Bq(t).

An automatic frequency control loop 30 is a circuit for removing a beat signal corresponding to the frequency deviation from the reception modulation signals Bi (t) and Bq (t), constituting automatic frequency control unit (AFC loop 30 hereinbelow) for removing the component of the frequency deviation $d\omega$. As illustrated, the AFC loop 30 comprises a phase rotation device 32 for removing the frequency deviation $d\omega$ component by phase-rotating the phase of the reception modulation signals Bi (t) and Bq (t) in accordance with the frequency deviation component; filters (digital transversal filters) 34 and 35 that cut the noise from the output of the phase rotation device 32; a frequency discriminator 36 for detecting the frequency deviation $d\omega$ ($\Delta f$) of the output signals i(t) and q(t) of the phase rotation device 32; a loop filter LF1 that integrates the detected frequency deviation $d\omega$; and a voltage control oscillator VCO1 that generates AFC reference signals Ri (t) and Rq (t), whose phase component is the frequency deviation $d\omega$, on the basis of a frequency deviation $d\omega 1$ integrated by the loop filter LF1. Further, the frequency deviation $d\omega$ can also be referred to as the frequency of one type of carrier wave $\cos(d\omega t)$, $\sin(d\omega t)$ of the base band, as shown in FIG. 2(5), and the AFC reference signals Ri (t) and Rq (t) are as follows.

$$Ri(t)=\cos(d\omega t) \quad (15)$$

$$Rq(t)=\sin(d\omega t) \quad (16).$$

Figure 3A:
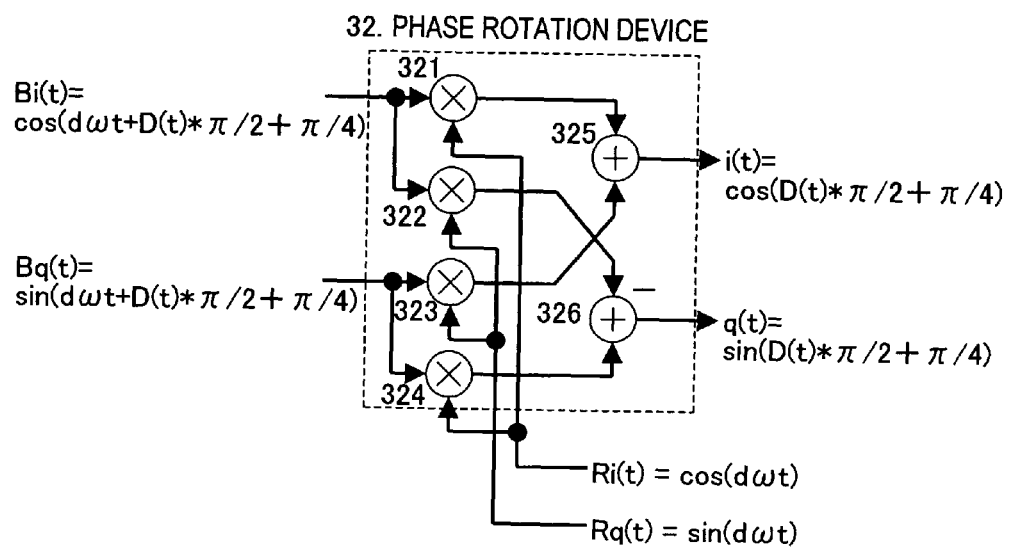
FIG. 3 shows the constitution of the phase rotation device of the AFC loop and the relationship between frequency-synchronized symbol points and the phase axis.

FIG. 3 shows the constitution of the phase rotation device of the AFC loop and the relationship between frequency-synchronized symbol points and the phase axis. An AFC phase rotation device 32 is a complex computation circuit with four multipliers 321 to 324 and two adders (subtractors) 325 and 326 that generates the signals i (t) and q (t) rendered by removing the phase component $d\omega t$ by phase-rotating the inputted reception modulation signals Bi (t) and Bq (t) by the phase $d\omega t$ of the AFC reference signals Ri (t) and Rq (t) including the frequency deviation component $d\omega$. The complex computation of the phase rotation device 32 is clear from the circuit diagram and is as follows. This is a QPSK example.

$$i(t)=Ri*Bi-Rq*Bq=\cos(D(t)*(\pi/2)+\pi/4) \quad (17)$$

$$q(t)=Rq*Bi+Ri*Bq=\sin(D(t)*(\pi/2)+\pi/4) \quad (18)$$

That is, the frequency deviation $d\omega$ detected by the frequency discriminator 36 can be removed from the reception modulation signals Bi (t) and Bq (t) by means of the complex computation circuit shown in FIG. 3. Further, in the removal of the frequency deviation, the frequency deviation is gradually removed by means of a frequency locking operation over a predetermined period by an AFC feedback loop and, once the frequency deviation has been removed by means of frequency locking, the frequency synchronous state is maintained as a steady state. As will be described subsequently, the frequency deviation $d\omega$ detected by the frequency discriminator 36 is corrected to the feedback frequency deviation $d\omega 1$ in accordance with the coefficient by means of the loop filter LF1 and then supplied to the oscillator VCO1. Therefore, the coefficient of the loop filter LF1 can be selected as a coefficient that widens the frequency range and raises the responsiveness in the frequency locking operation state and can be selected as a coefficient that narrows the frequency range and lowers the responsiveness in the steady state, whereby control to establish each of the operation states can be implemented.

Figure 3B:
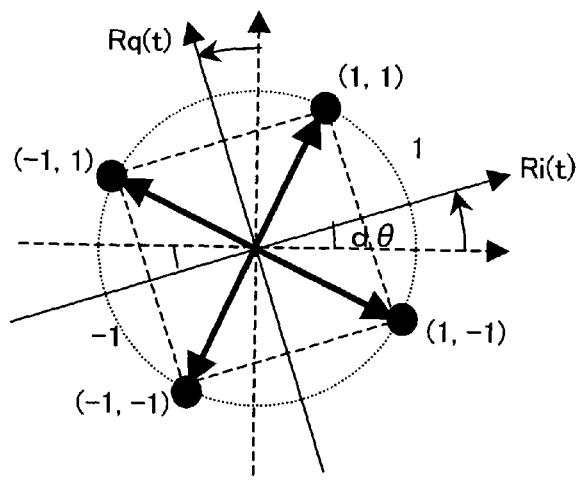

Further, the modulation data is D (t)=0, 1, 2, 3 and, therefore, as a result of QPSK demodulation processing, i (t) and q (t) take four symbol points, which are (1, 1), (−1, 1), (−1, −1), and (1, −1). That is, as shown in FIG. 3B, there are four symbol points. However, although the AFC loop 30 tracks the variations in the frequency deviation $d\omega t$, the phase error $d\theta$ contained in the modulation data D (t) component cannot be locked to the reference phase (axis of broken line in FIG. 3B) That is, the phase difference component $d\theta$ between the transmission side and reception side is contained in the modulation data D (t) of the I channel signal i (t) and Q channel signal q (t) indicated by the equations (17) and (18). The phase difference component $d\theta$ is removed by a subsequent-stage carrier recovery loop (CR loop) 40. Carrier recovery will be detailed later.

Figure 4:
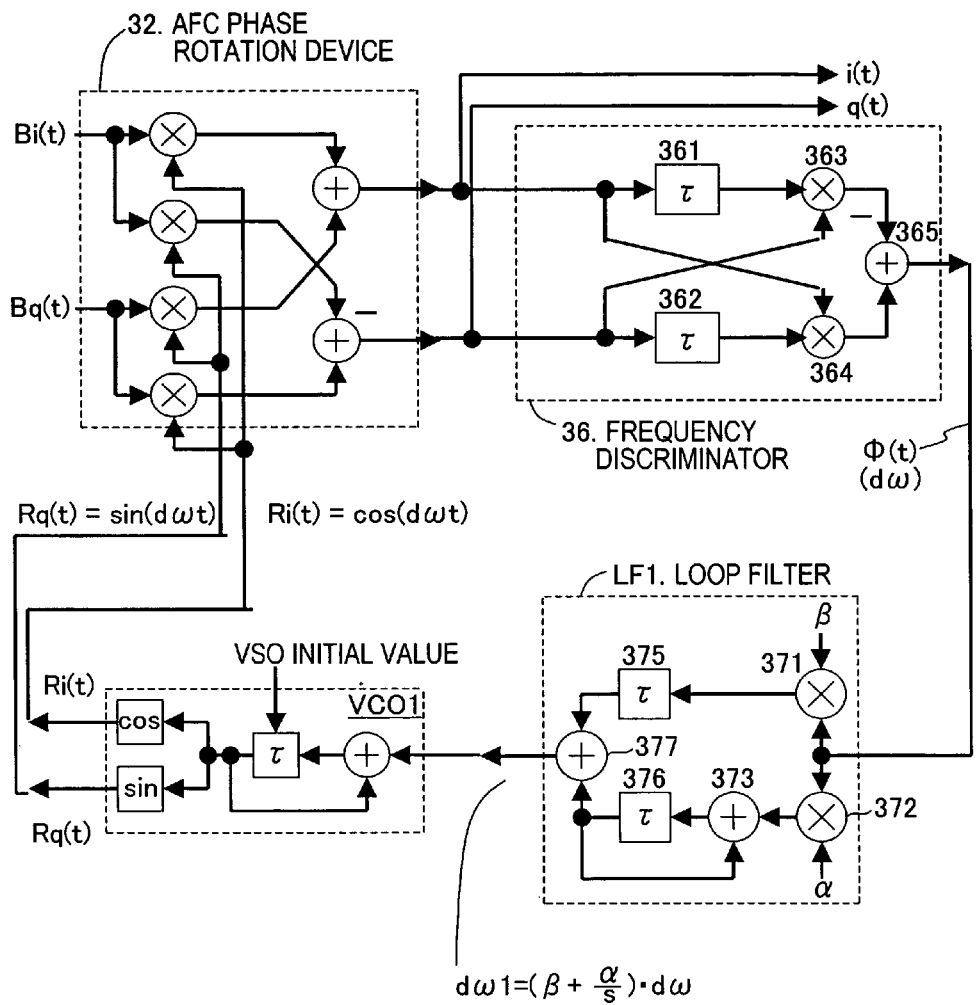
FIG. 4 is a constitutional view of the AFC loop of this embodiment.

FIG. 4 is a constitutional view of the AFC loop of this embodiment. The AFC phase rotation device 32 has the same constitutional view as that in FIG. 3. The frequency discriminator 36 is a processor that is constituted by 1-bit delay flip-flops 361 and 362, multipliers 363 and 364 and a subtractor 365, and detects the frequency deviation $d\omega$. In a locking operation in which the frequency deviation $d\omega$ is not sufficiently removed by the phase rotation device 32 and frequency synchronization is not established, the frequency deviation $d\omega$ is still contained in the outputs i(t) and q(t) of the phase rotation device 32. That is, similarly to the equations (13b) and (14b), $$i(t)=\cos[d\omega t+D(t)*(\pi/2)+\pi/4] \quad (13b)$$

$$q(t)=\sin[d\omega t+D(t)*(\pi/2)+\pi/4] \quad (14b).$$

Therefore, discrimination of the frequency involves finding $\Phi(t)=-\sin(d\omega t)$ by calculating i(t) and q(t) at the times t1 and t2 as follows.

$$\begin{aligned}\Phi(t) &= q(t1)*i(t2)-i(t1)*q(t2)\\ &= -\sin(\omega t1-\omega t2)\\ &= -\sin(d\omega t)\end{aligned} \quad (19)$$

(however, $d\omega t=\omega t1-\omega t2$)

because $d\omega t$ is $-\pi/2<d\omega t<\pi/2$ at best, $\Phi(t)$ substantially corresponds to a time variation of the frequency deviation component $d\omega$.

The loop filter LF1 in FIG. 4 is constituted by multipliers 371, 372, adders 373, 377, and delay devices 375, 376. This loop filter comprises integration circuits (372, 373, 276) that find integrated values by multiplying the frequency deviation $d\omega$ detected by the frequency discriminator 36 by coefficient $\alpha$, and proportion circuits (371, 375) that multiply the frequency deviation $d\omega$ by the coefficient $\beta$, whereby the feedback-control frequency deviation $d\omega 1$ is found by the following equation.

$$d\omega 1=(\beta+\alpha/s)*d\omega \quad (20)$$

Here, s is the sample number.

Thereafter, the voltage control oscillator VCO1 comprises an integration circuit consisting of an adder and delay device $\tau$ and a sine wave generation portion sin and cosine wave generation portion cos. Further, the AFC reference signals Ri (t) and Rq (t) including the phase of the control frequency deviation $d\omega 1$ provided by the loop filter LF1 are generated by the oscillator VCO1 and supplied to the phase rotation device 32.

That is, by implementing feedback control on the basis of the control output $d\omega 1$ that is found by the loop filter LF1 in accordance with coefficients $\alpha$ and $\beta$, removal of the frequency deviation is performed by proportion and integration control. Therefore, as described earlier, by changing the coefficients α and β, the responsiveness of the feedback control can be raised and the frequency bandwidth can be widened to render a state suited to the frequency locking operation (frequency locking operation state), whereas the responsiveness can be lowered and the frequency bandwidth can be narrowed to render a state suited to a stabilized steady operation.

More specifically, in the locking operation state, the coefficients α and β are both controlled to a large value and, as a result, the responsiveness of the feedback loop increases and the bandwidth also widens. On the other hand, in the steady state, the coefficients α and β are both controlled to a small value and, as a result, the responsiveness of the feedback loop drops and the bandwidth also narrows. These coefficients are variably set in correspondence with a locking operation by the control portion (described later).

Returning now to FIG. 1, the I, Q channel signals i (t) and q (t) respectively, from which the frequency deviation component dω has been removed by the AFC loop 30 contain the phase difference component dθ, as described in FIG. 3B and this phase difference component must therefore be removed. Hence, a carrier recover loop (CR loop) 40 is provided as the carrier recovery unit downstream of the AFC loop 30. The constitution of the CR loop 40 comprises, similarly to the AFC loop 30, a CR phase rotation device 42 that rotates I and Q channel signals i (t) and q (t) by the phase difference dθ; a phase difference detector 44 that detects the phase difference dθ from the output signals I (t) and Q (t) of the phase rotation device 42; a loop filter LF2 that generates a phase error dθ1 for proportion and integration control from the phase error dθ by means of a predetermined coefficient; and a voltage control oscillator VCO2 that generates CR reference signals Rci (t), Rcq (t) corresponding to the output dθ1 of the loop filter. The phase rotation device 42, loop filter LF2 and voltage control oscillator VCO2 have the same constitution as the circuit corresponding to the AFC loop 30. Further, the constitution of the phase difference detector 44 will be described later.

The I-channel signal I (t) and Q-channel signal Q (t) of which the frequency deviation dω is removed by the AFC loop 30 and the phase error dθ has been removed by the CR loop 40 are supplied to a demodulation circuit (not shown), whereupon the corresponding demodulation processing is performed.

Further, the output signals i (t) and q (t) of the AFC loop 40 are supplied to an automatic gain control circuit 52, whereupon the electrical power is detected and the control gain G of the amplifier 10 corresponding to this electrical power is generated. The output of the AGC 52 is analog-converted by the DA converter DAC and supplied as the control gain G of the amplifier 10 of the input portion via a lowpass filter LPF. As a result of the AGC loop, the electrical power of the reception signal S (t) is controlled to a fixed level. Further, the RSSI (Receive Signal Strength Indication) detector 54 generates an RSSI pulse signal RSSIp indicating that the reception signal S (t) has been received by observing the gain G generated by the AGC 52. While a reception signal S (t) does not exist, the gain G is controlled to a maximum value and, when the reception signal is received, the gain G is reduced to a suitable value. Accordingly, by observing the gain G, the RSSI pulse signal can be generated.

Constitution of AFC Synchronous and Asynchronous Detection Unit

Figure 5:
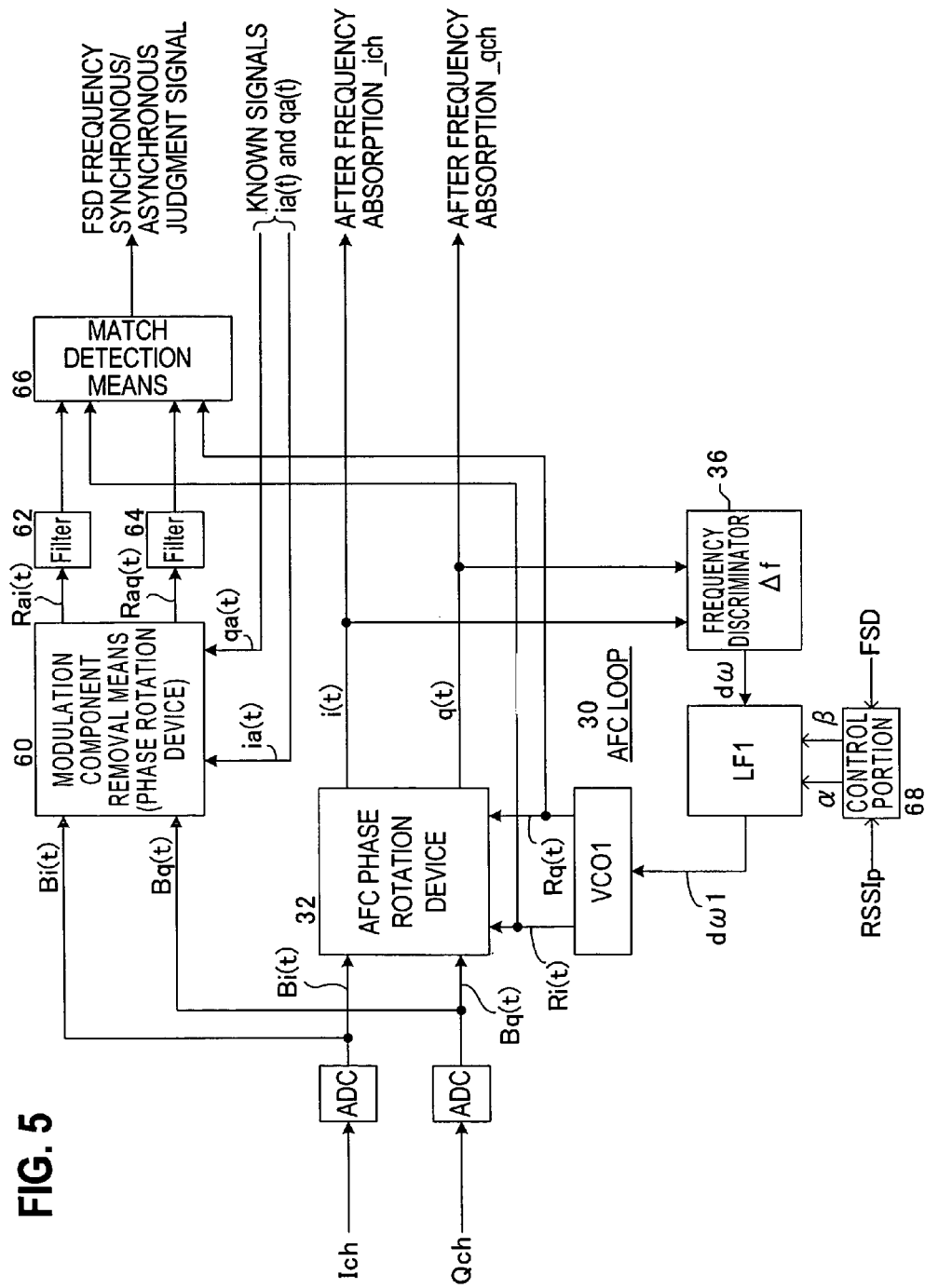
FIG. 5 shows the constitution of the AFC synchronous and asynchronous detection means of this embodiment.

FIG. 5 shows the constitution of the AFC synchronous and asynchronous detection unit of this embodiment. In addition to the phase rotation portion 32, frequency discriminator 36, loop filter LF1, and oscillator VCO1 that constitute the AFC loop 30, modulation component removal means 60, smoothing filters 62 and 64, and match detection means 66 are provided, as means for detecting the synchronous state and asynchronous state. Further, in FIG. 5, a filter DTF in the AFC loop 30 is omitted. The modulation component removal means 60 is a phase rotation device that generates a signal for the frequency deviation component dω by removing the modulation component θ (t) of the reception modulation signals Bi (t) and Bq (t) inputted to the AFC loop 30. For this reason, with timing at which known signals such as a frame header and pilot signal and so forth are contained in the reception signal, modulation components ia (t) and qa (t) consisting of these known signals are generated and the modulation components ia (t) and qa (t) are supplied to the modulation component removal means 60. The modulation component removal means 60 then rotates the phases of the reception modulation signals Bi (t) and Bq (t) by the phase corresponding to the modulation components ia (t) and qa (t) and generates synchronization detection reference signals Rai (t) and Raq (t) from which the modulation component has been removed.

The synchronization detection reference signals Rai (t) and Raq (t) are signals corresponding to the frequency difference dω contained in the reception modulation signals Bi (t) and Bq (t) and, when the AFC loop 30 is in the synchronous state, are theoretically the same signals as the AFC reference signals Ri (t) and Rq (t), which are the outputs of the oscillator VCO1 of the AFC loop 30. When the AFC loop 30 is in the asynchronous state, the synchronization detection reference signals Rai (t) and Raq (t) are different signals from Ri (t) and Rq (t). That is, the AFC loop 30 performs a locking operation in the direction in which the frequency deviation component is removed by controlling the oscillator VCO1, and when the AFC reference signals Ri(t) and Rq(t) supplied to the AFC phase rotation device 32 matching the frequency deviation dω contained in the reception modulation signal, the loop 30 enters to a synchronous state, and is subsequently controlled to a steady state. Therefore, in order to check whether the AFC loop 30 is in a synchronous state or asynchronous state, it should be checked whether the AFC reference signals Ri (t) and Rq (t) match the synchronous detection reference signals Rai (t) and Raq (t).

Therefore, in this embodiment, the match detection means 66 compare the synchronous detection reference signals Rai (t) and Raq (t) generated by the modulation component removal means 60 and the AFC reference signals Ri (t) and Rq (t) corresponding to the frequency deviation component detected by the AFC loop 30, detects a match or mismatch, and generates a synchronous and asynchronous detection signal FSD. When the AFC loop 30 is in the frequency synchronous state, the match detection means 66 detect the match between the two input signals and, when the AFC loop 30 is in the frequency asynchronous state, the match detection portion 66 detects a mismatch between the two input signals. Further, when the asynchronous state is detected, in response to the synchronous and asynchronous detection signal FSD, the control portion 68 controls the AFC loop 30 to the frequency locking state by setting the coefficients α and β of the loop filter LF1 to the coefficients of the locking state. That is, even though the AFC loop 30 is controlled to the steady state, once a frequency asynchronous state is detected, then the AFC loop 30 can be controlled to the frequency locking state so that a locking operation to a synchronous state can be performed.

The control portion 68 normally controls the AFC loop 30 to the frequency locking state in response to the RSSI pulse RSSIp that is generated when reception of the reception signal S (t) has begun. Further, after a predetermined period has elapsed, the control portion 68 controls the AFC loop 30 to a steady state. Further, according to this embodiment, even when reception of the reception signal S (t) has not begun, if the AFC loop 30 is in the asynchronous state, this state is detected by the synchronous and asynchronous detection means and the AFC loop 30 is controlled to the frequency locking state in response to the synchronous and asynchronous detection signal FSD. Therefore, even when the AFC loop 30 fails in the frequency locking operation, the locking operation can be performed once again. In addition, even in the event of the asynchronous state for reasons other than blocking of the reception signal in the steady state, this asynchronous state is detected and control to the frequency locking state is implemented to permit a return to the synchronous state.

Figure 6:
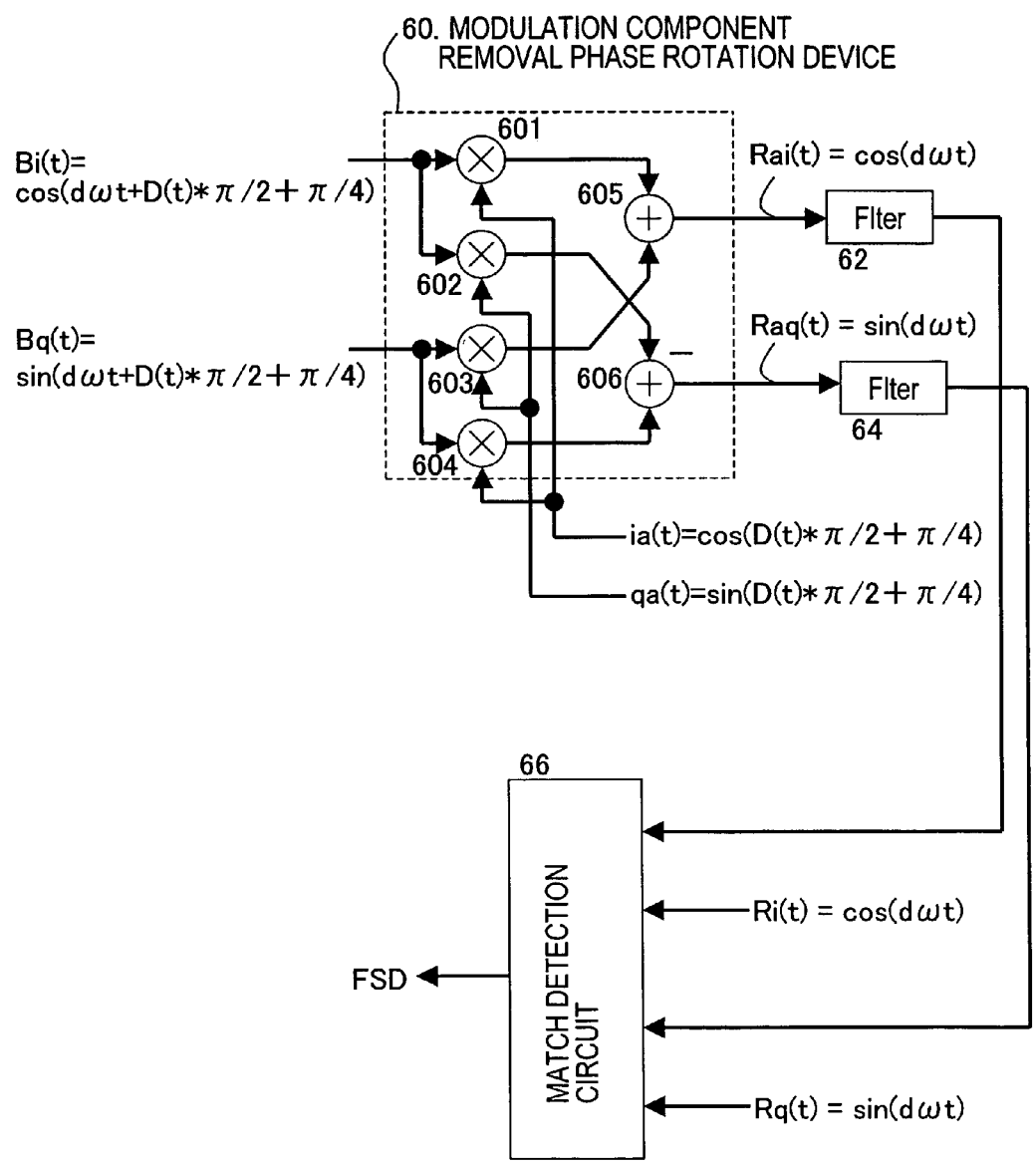
FIG. 6 is a detailed constitutional view of modulation component removal means constituting the AFC synchronous and asynchronous detection means and the match detection circuit of this embodiment.
Figure 7:
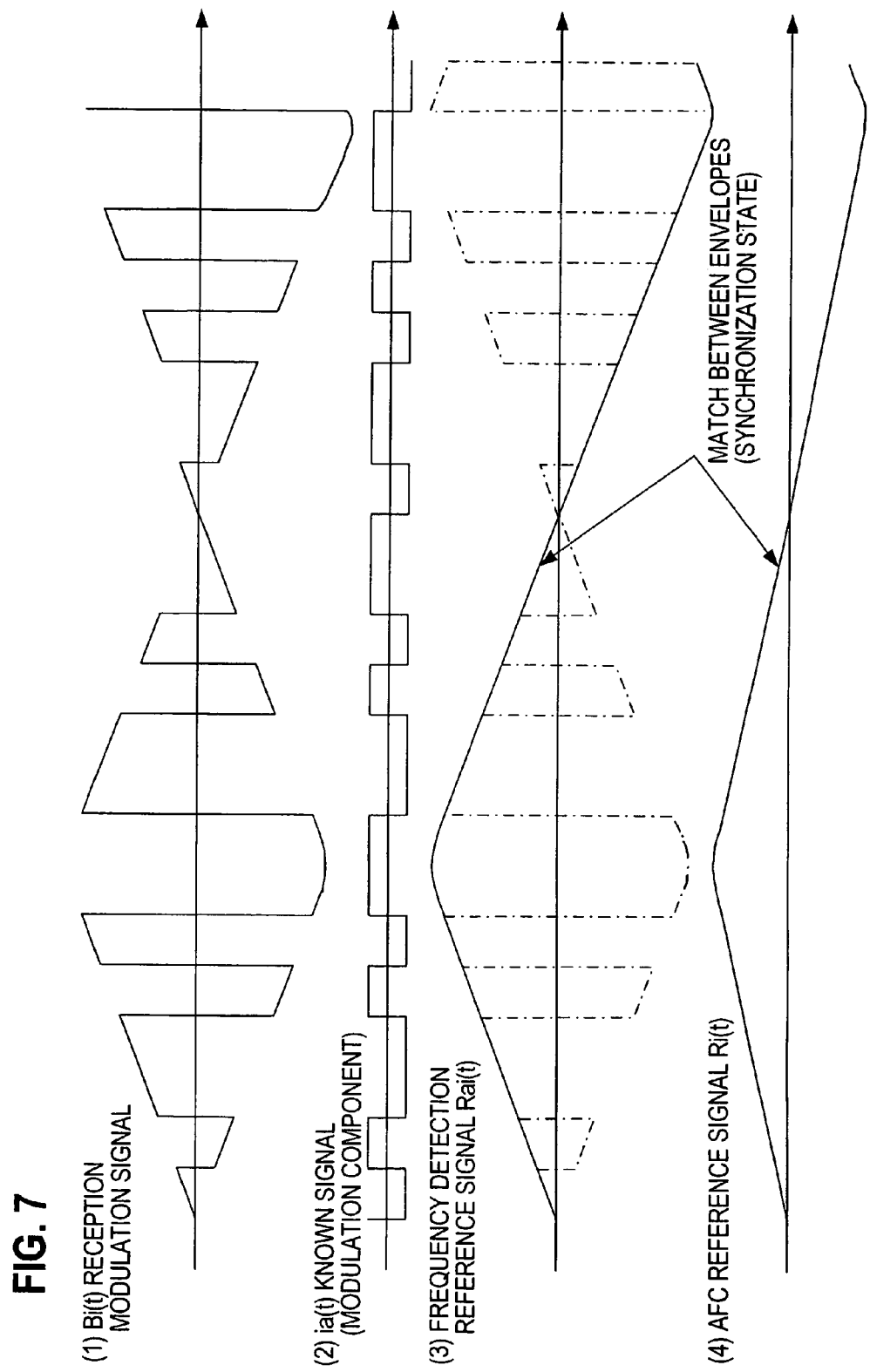
FIG. 7 is a waveform diagram for illustrating the operation of the AFC synchronous and asynchronous detection means.

FIG. 6 is a detailed constitutional view of the modulation component removal unit and match detection circuit that constitute the AFC synchronous and asynchronous detection unit of this embodiment. Further, FIG. 7 is a waveform diagram serving to illustrate the operation of the AFC synchronous and asynchronous detection unit. Although signal equations are mentioned for a QPSK example in FIG. 6, the waveform diagram in FIG. 7 is shown in a BPSK example for the purpose of simplification as per FIG. 2.

The reception modulation signals Bi (t) and Bq (t) are inputted to the phase rotation device 60 constituting modulation component removal unit and the signals ia (t) and qa (t) including a modulation component that are generated on the reception side on the basis of the known signal D (t) are supplied to the phase rotation device 60. The phase rotation device 60 then phase-rotates the reception modulation signals Bi (t) and Bq (t) by the phase [D (t)*(π/2)+π/4] of the modulation component to remove the modulation component from the reception modulation signals, whereby the synchronization detection reference signals Rai (t) and Raq (t) including the frequency deviation dω are generated.

Illustrating this by means of the BPSK signal waveform in FIG. 7, the reception modulation signal Bi (t) (FIG. 7(1)) is phase-modulated on the basis of the known signal ia (t) in which the cosine wave cos (dωt) of the frequency deviation dω (a triangular wave for the purpose of simplification in FIG. 7) is the modulation component. That is, since this is a BPSK signal waveform, this gives $$Bi(t)=\cos(d\omega t+D(t)*\pi) \quad (21).$$

That is, the envelope of the reception modulation signal Bi (t) shown in FIG. 7(1) corresponds to the cosine wave of the frequency deviation component dωt.

Therefore, by supplying the known signal $$ia(t)=\cos(D(t)*\pi) \quad (22)$$

in FIG. 7(2), which is the modulation component generated from the existing data D (t) to the phase rotation device 60, the phase of the known signal component is removed and the synchronous detection reference signal Rai (t) in FIG. 7(3) is generated.

$$Rai(t)=\cos(d\omega t) \quad (23)$$

Although the synchronization detection reference signal contains the modulation noise indicated by the dashed line in FIG. 7(3), this modulation noise is removed by the smoothing filters 62 and 64.

On the other hand, the AFC reference signal Ri (t) (FIG. 7(4)) corresponding to the frequency deviation dω detected by the AFC loop 30 is Ri (t)=cos (dωt) in the synchronous state and Ri (t)=cos (dωt+Δ) in the asynchronous state.

Accordingly, by comparing the synchronization detection reference signals Rai (t) and Raq (t) with the AFC reference signals Ri (t) and Rq (t) respectively, the match detection means 66 are able to detect a synchronous state in the event of a match and an asynchronous state in the event of a mismatch. In the example in FIG. 7, the envelopes of the two reference signals (3) and (4) match and, therefore, the synchronous state thereof are detected. Further, the detection signal FSD is supplied to the control portion 68 for controlling the loop filter in the AFC loop 30 and the AFC loop 30 is controlled to the locking state when the asynchronous state is detected, as will be described later.

The match detection means 66 detect whether or not the envelope waveforms of the two reference signals match. However, because, under the effects of noise and interference of the wireless channels, the envelopes of the two reference signals are not necessarily ideal one, and, as a result of the timing of the comparison, cannot necessarily be compared accurately. However, for example, the judgment probability can be increased by calculating the average of the match and mismatch judgment results.

Overall Constitution of Wireless Reception Device

Figure 8:
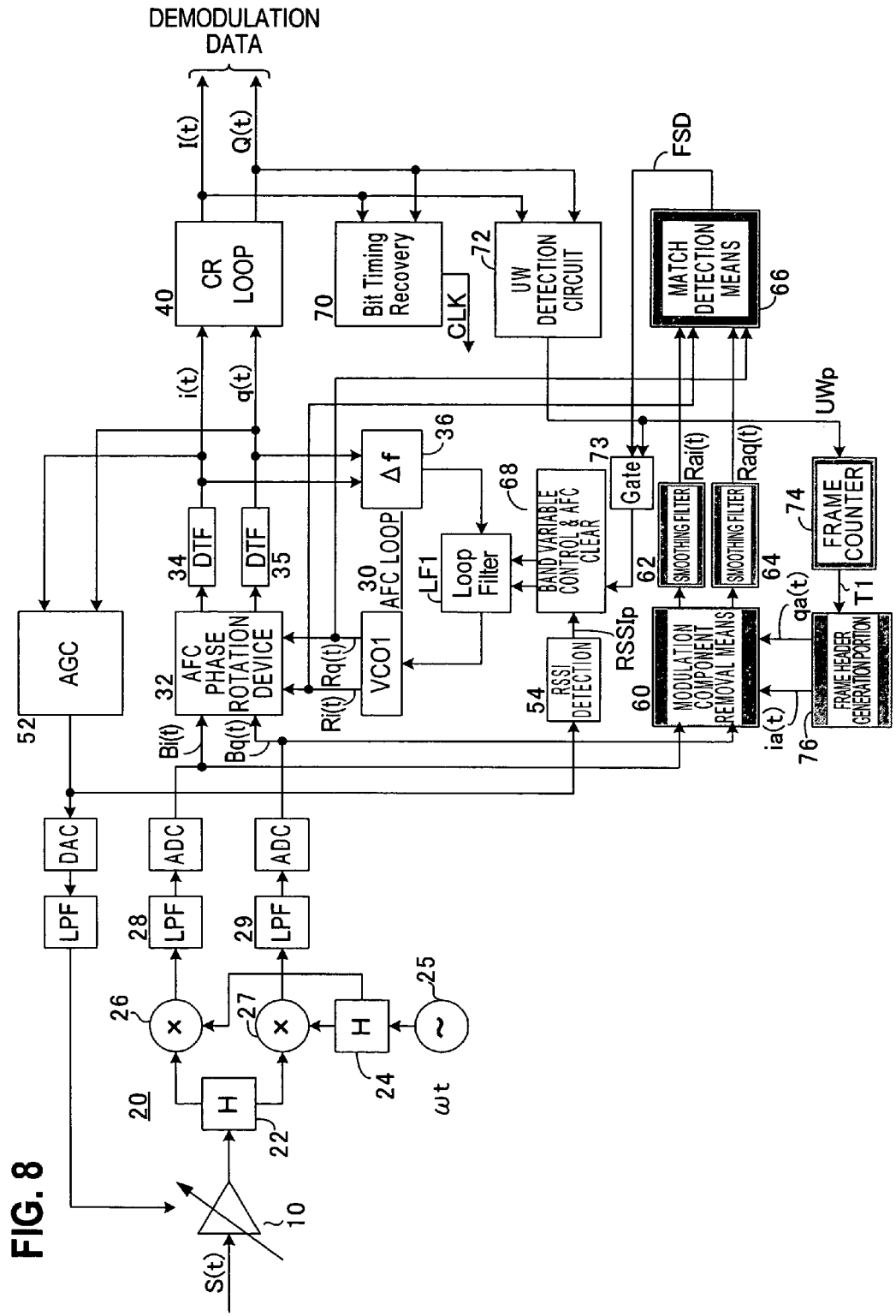
FIG. 8 is an overall constitutional view of the wireless reception device of this embodiment.

FIG. 8 is an overall constitutional view of the wireless reception device of this embodiment. That is, in the constitution of FIG. 8, the AFC synchronous and asynchronous detection unit in FIGS. 5 and 6 have been added to the wireless reception device of FIG. 1. Therefore, the same reference numerals are assigned to the AFC synchronous and asynchronous detection unit. FIG. 8 also shows a bit timing recovery circuit 70 that generates a timing clock CLK from the reception modulation signals I (t) and Q (t) of the baseband; a unique word detection circuit 72 that generates a unique word detection pulse UWp that detects a unique word in the header of the frame; a gate circuit 73 that controls the supply of the synchronous and asynchronous detection signal FSD to the control portion 68 of the AFC loop; a frame counter 74 that counts the frame periods in response to the unique word detection pulse UWp; and a frame header generation portion 76 that generates the known signals ia (t) and qa (t) contained in the frame header.

Figure 9:
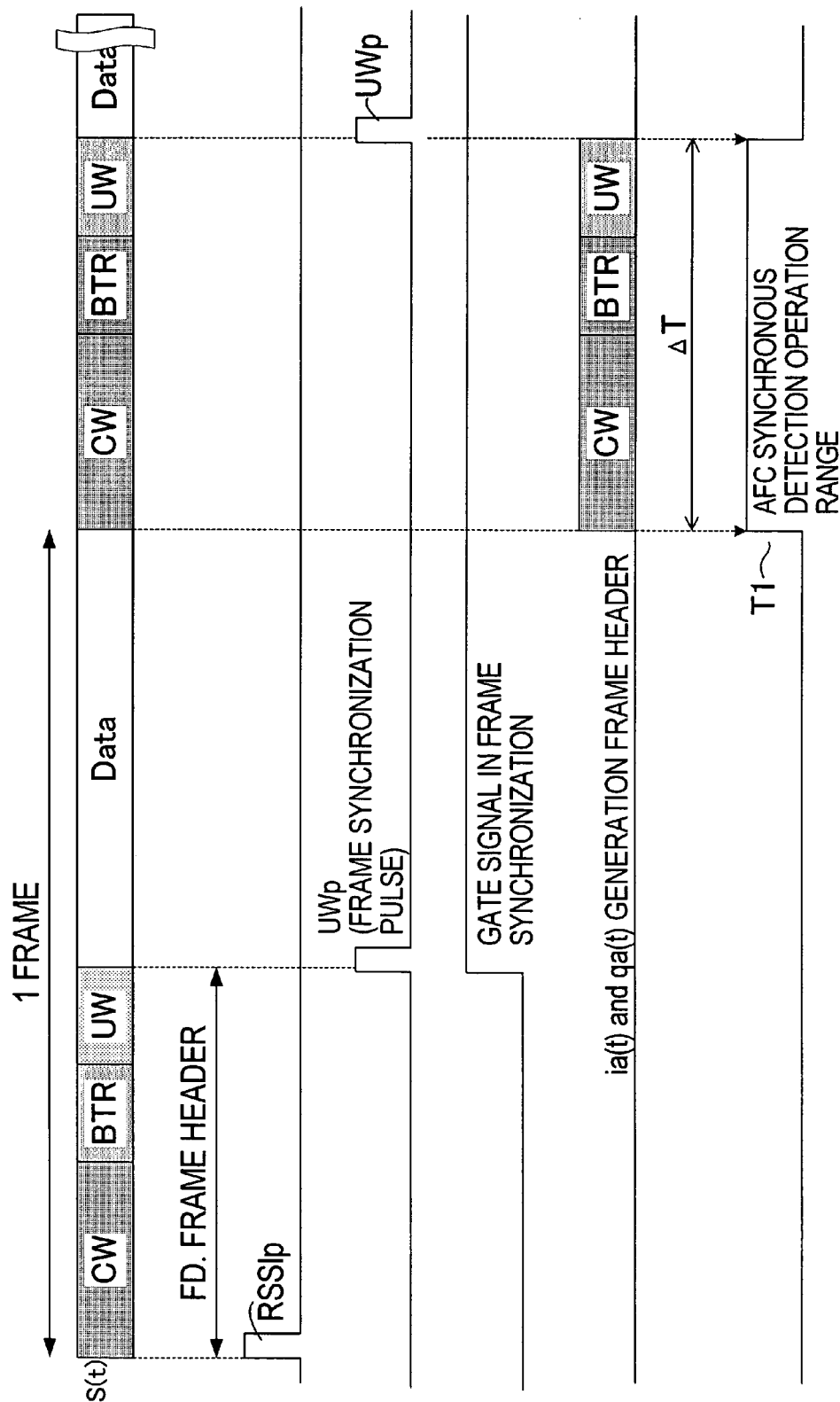
FIG. 9 shows the timing of AFC synchronous and asynchronous detection.

FIG. 9 shows the timing for the AFC synchronous and asynchronous detection. A signal that constitutes one frame by means of a frame header FD and data Data is shown as an example of the reception signal S (t) in FIG. 9. The RSSI detection pulse RSSIp is generated at the start of reception of the reception signal S (t). The frame header FD comprises, for example, a continuous wave CW including only a carrier wave, a bit timing recovery signal BTR which is modulated by means of only a clock in which '1' and '0' are repeated, and a unique word signal UW that is modulated by means of a signal known between transmission and reception. The unique word UW is an known pattern signal that is used in performing phase uncertainty removal pertaining to PSK modulation and frame synchronization timing, for example. Further, when the unique word signal UW is detected, a unique word detection pulse UWp is generated and the unique word detection pulse UWp is used as the frame synchronization pulse. Further, the period of the continuous wave CW is a training period for performing AFC frequency locking and is also a training period for phase locking of the carrier recovery circuit.

As shown in FIG. 8, the unique word detection circuit 72 generates the unique word detection pulse UWp upon detecting the unique word UW. In response to the pulse UWp, the frame counter 74 counts the time of the data part within the frame and generates a control signal T1 that is at the H level over the subsequent frame header period ΔT. While the control signal T1 is at the H level, the frame header generation portion 76 generates known signals ia (t) and qa (t) that consist of the continuous wave CW, the bit timing recovery signal BTR, and the unique word UW that are contained in the frame header, and supply the known signals ia (t) and ga (t) to the modulation component removal means 60. That is, ia (t) and qa (t) are signals that are indicated by the above equation (22) in which the modulation components there of are data D (t) consisting of all zeros in the continuous wave CW, data D (t) in which '1' and '0' are repeated in the bit timing recovery signal BTR and data D (t) of the unique word in the unique word UW.

Thus, the modulation component removal means 60 are supplied with the signals ia (t) and iq (t) generated from known signals while the frame header FD is contained in the reception signal S (t) and remove the phase of the modulation component of the known signals from the reception modulation signals Bi (t) and Bq (t). The match detection means 66 compare the synchronization detection reference signals Rai (t) and Raq (t) from which the modulation component has been removed and the AFC reference signals Ri (t) and Rq (t) that are generated by the AFC loop 30. When the AFC loop 30 is in the synchronous state, the synchronous and asynchronous detection signal FSD indicating a match state is outputted over the period T1 of the frame header FD. In other periods, the frame header generation portion 76 does not generate suitable known signals and, therefore, the match detection means 66 is unable to detect the synchronous state. Therefore, the preceding synchronous and asynchronous detection signal FSD is supplied by the gate circuit 73 to the control portion 68 in sync with the timing of the unique word detection pulse UWp. That is, the synchronous and asynchronous detection signal FSD detected in the suitable period T1 is supplied to the control portion 68 by the gate circuit 73. Upon detecting the asynchronous state, the control portion 68 controls the loop filter LF1 to the frequency locking state by way of response. More specifically, the value of the stored synchronous state is cleared and the coefficients α and β of the loop filter LF1 are set to the value of the frequency locking state. Further, these coefficients are changed in accordance with a preset time schedule and the AFC loop 30 is controlled for locking to the frequency synchronous state.

Thus, by using the known signal that is known in advance to be included in the reception signal on the reception side, the signals ia (t) and qa (t) of the modulation component can be generated on the reception side and, by removing the modulation component from the reception modulation signals Bi (t) and Bq (t) by means of modulation component removal means 60, the synchronous and asynchronous reference signals Rai (t) and Raq (t) can be generated.

A pilot signal is sometimes transmitted between transmission and reception sides and sometimes the known signals are included in the pilot signal. In such a case, the modulation component can be removed as above by using the known signals of the pilot signal. Therefore, a known signal is not limited to a signal that is included in the frame header.

Hard Judgment Circuit

Figure 10:
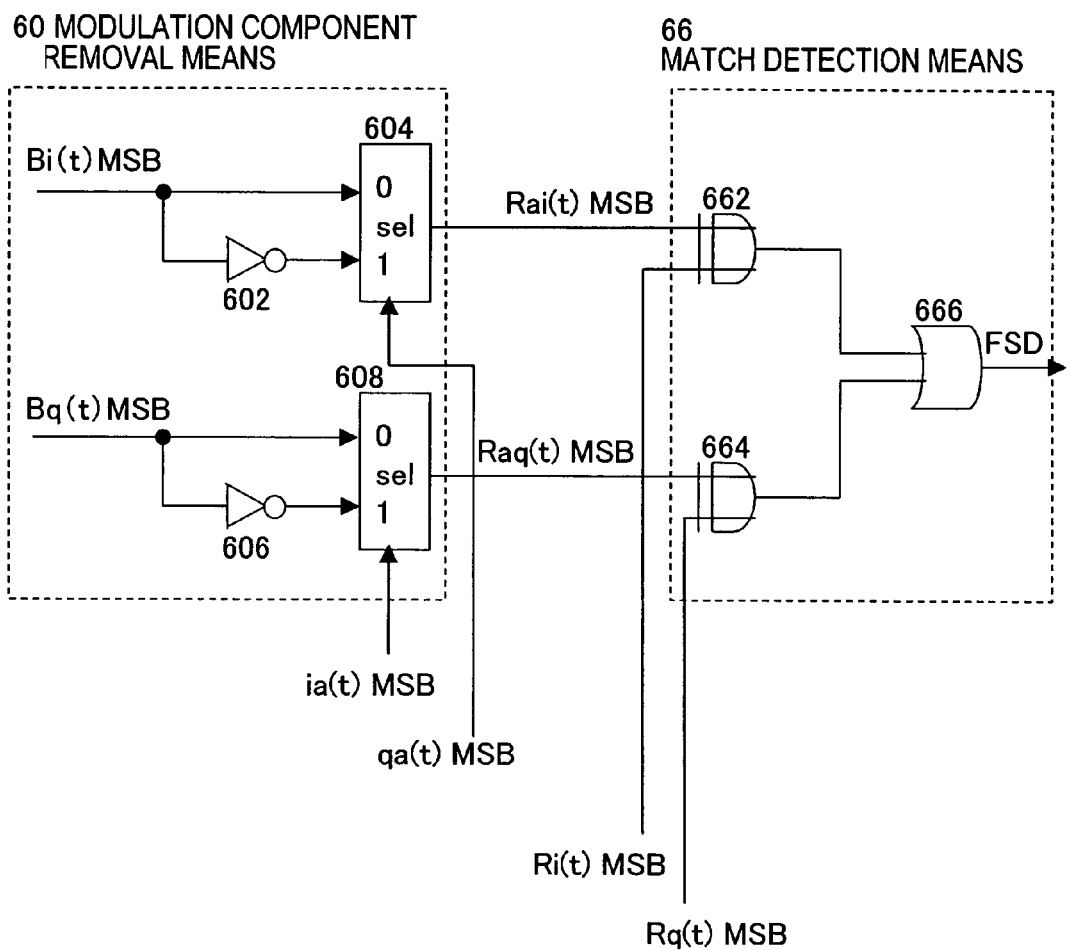
FIG. 10 shows another circuit of modulation component removal means 60 and a match detection portion 66 of this embodiment.

FIG. 10 shows another circuit of the modulation component removal means 60 and match detection portion 66 of this embodiment. A BPSK example is shown. The modulation component removal means 60 described in FIG. 6 use 12-bit reception modulation signals Bi (t) and Bq (t) and modulation component signals ia (t) and qa (t) of a known 9-bit pattern and generate 12-bit synchronous and asynchronous reference signals Rai (t) and Raq (t) by performing a hard-judgment phase rotation calculation. Further, the match detection means 66 compare the 12-bit synchronous and asynchronous reference signals Rai (t) and Raq (t) and the 12-bit AFC reference signals Ri (t) and Rq (t). That is, this constitutes a hard judgment circuit that uses all bits including the sign bits of the digital signal.

On the other hand, the modulation component removal means 60 and match detection means 66 in FIG. 10 are a hard judgment circuit that uses only the sign bits of the digital signal. Only sign bits constituting the highest order bits MSB of each digital signal are extracted by an MSB extraction circuit (not shown) and supplied to the modulation component removal means 60 and match detection means 66. The modulation component removal means 60 comprise inverters 602 and 606 and selector circuits 604 and 608. The selector circuit 604 outputs a noninverted signal or inverted signal for the MSB of the reception modulation signal Bi (t), in accordance with the MSB of the modulation component signal ia (t) of the known signal, as the MSB of the synchronous and asynchronous reference signal Rai (t). The selector circuit 608 also similarly outputs the MSB of the synchronous and asynchronous reference signal Raq (t). On the other hand, the match detection means 66 is constituted by EOR gates 662 and 664 and an OR gate 666 and detects whether there is a match with the MSB of the AFC reference signals Ri (t) and Rq (t). The synchronous and asynchronous signal FSD is in the synchronous state '0' if both the common phase component and quadrature component match, and is in the asynchronous state '1' if neither matches.

Figure 11:
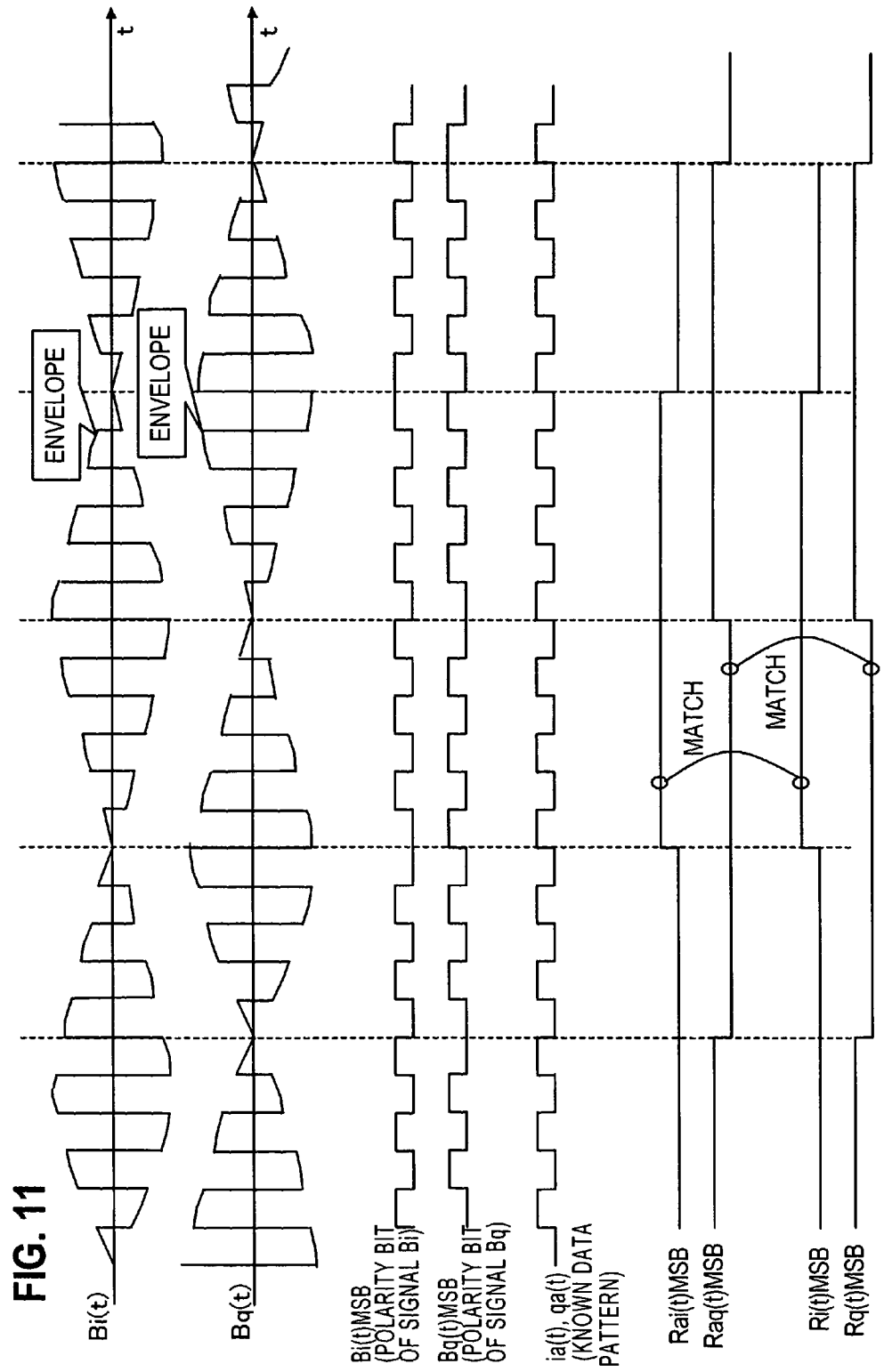
FIG. 11 is a sign bit waveform diagram serving to illustrate the operation of FIG. 10.

FIG. 11 is a sign bit waveform diagram serving to illustrate the operation of FIG. 10. As per FIG. 7(1), the reception modulation signals Bi (t) and Bq (t) include the modulation component of the known signals and the frequency deviation component and the envelope corresponds to the frequency deviation component. However, the frequency deviation component of the two signals has a π/2 phase shift. On the other hand, when only the MSB constituting the sign bit of these signals is extracted, this is as per the illustration. On the other hand, the MSB of the known data is as per the illustration and is the same as the reception modulation signal Bi (t) MSB.

Therefore, the known data component is removed by the selector circuits 604 and 606 of the modulation component removal means 60 and the synchronous and asynchronous reference signals Rai (t) MSB and Raq (t) MSB are generated. This signal is the same as the sign bit of the envelope of the reception modulation signals Bi (t) and Bq (t).

Meanwhile, if the sign bits Ri (t) MAB and Rq (t) MSB of the AFC reference signals of the AFC loop are in the synchronous state, there must be a match with the sign bit of the envelope. In FIG. 11, the synchronous state is shown and the sign bits Rai (t) MSB and Raq (t) MSB of the synchronous and asynchronous reference signal and the sign bits Ri (t) MAB and Rq (t) MSB of the AFC reference signal match one another and the synchronous and asynchronous detection signal FSD is generated. If both match, FSD=0.

It can be seen that the constitution of the circuit of the modulation component removal means and match detection means is straightforward by using the sign bit MSB of the respective signals as detailed earlier.

Figure 12:
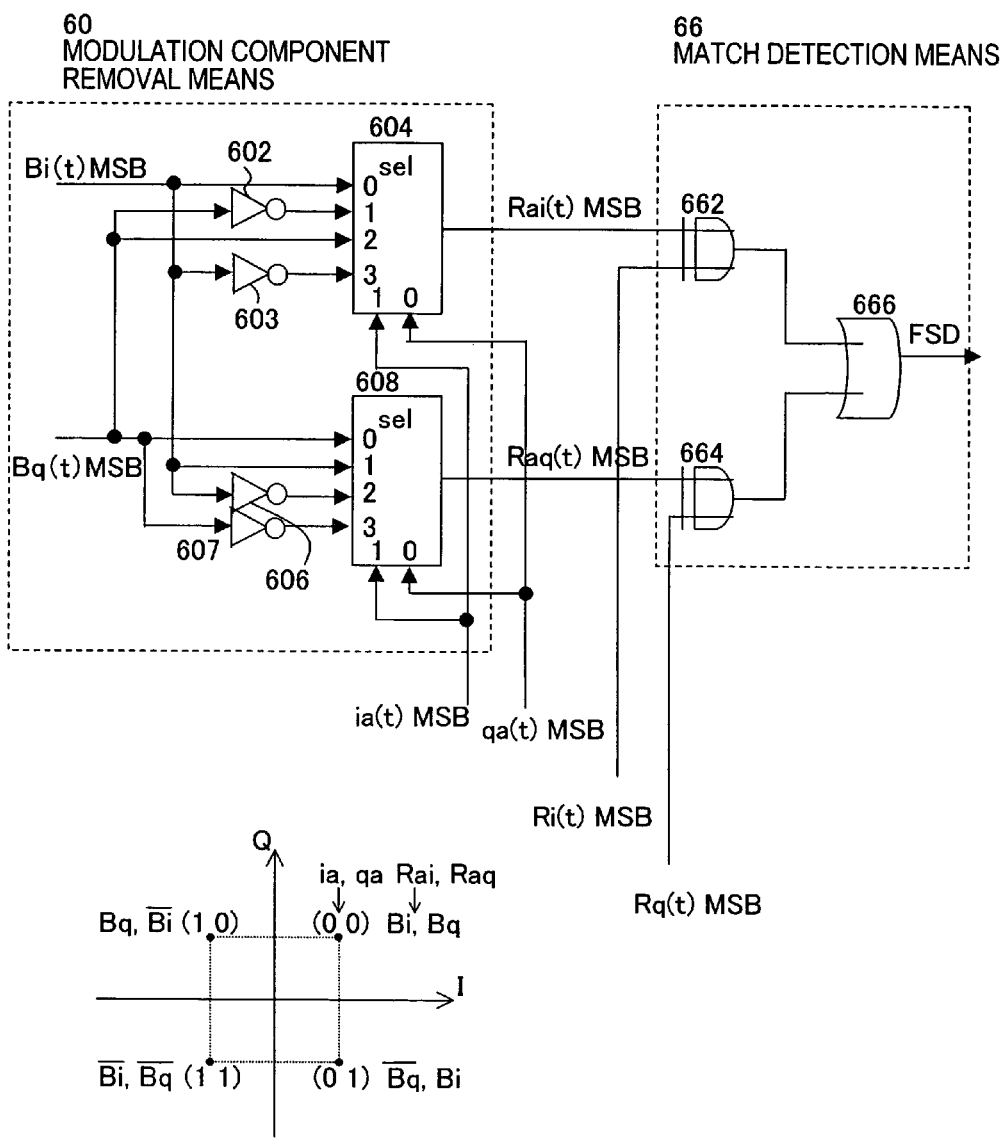
FIG. 12 shows another circuit in addition to the modulation component removal means 60 and match detection means 66 of this embodiment.

FIG. 12 shows another circuit of the modulation component removal means 60 and match detection means 66 of this embodiment. This circuit is a QPSK example. The modulation component removal means 60 are constituted by inverters 602, 603, 606, and 607, and selector circuits 604 and 608 that select any one of four inputs via two bits. In a QPSK case, the sign bits ia (t) MSB and qa (t) MSB of the known pattern are information indicating to which quadrant of four symbol points it belongs. Therefore, the selector circuit outputs the combination of signals shown below as the sign bits Rai (t) MSB and Raq (t) MSB of the synchronous and asynchronous reference signal in accordance with a combination of sign bits Rai (t) MSB and Raq (t) MSB of the synchronous and asynchronous reference signal.

As shown in the lower half of FIG. 12, at the first quadrant (ia, iq=0, 0), the sign bits Rai (t) MSB and Raq (t) MSB of the synchronous and asynchronous reference signal are each Bi (t) MAB and Bq (t) MSB respectively. At the fourth quadrant (ia, iq=0, 1), the sign bits Rai (t) MSB and Raq (t) MSB of the synchronous and asynchronous reference signal are each an inversion of Bq (t) MAB, and Bi (t) MSB respectively. At the second quadrant (ia, iq=1, 0), the sign bits Rai (t) MSB and Raq (t) MSB of the synchronous and asynchronous reference signal are each Bq (t) MAB and an inversion of Bi (t) MSB respectively. Further, at the third quadrant (ia, iq=1, 1), the sign bits Rai (t) MSB and Raq (t) MSB of the synchronous and asynchronous reference signal are each an inversion of the Bi (t) MAB and an inversion of the Bq (t) MSB respectively.

Further, whether the sign bits of the synchronous and asynchronous reference signal determined as detailed above matches the sign bits of the AFC reference signal in the AFC loop is detected by the match detection means 66. The constitution and operation of the match detection means 66 are the same as those in FIG. 10.

Figure 13:
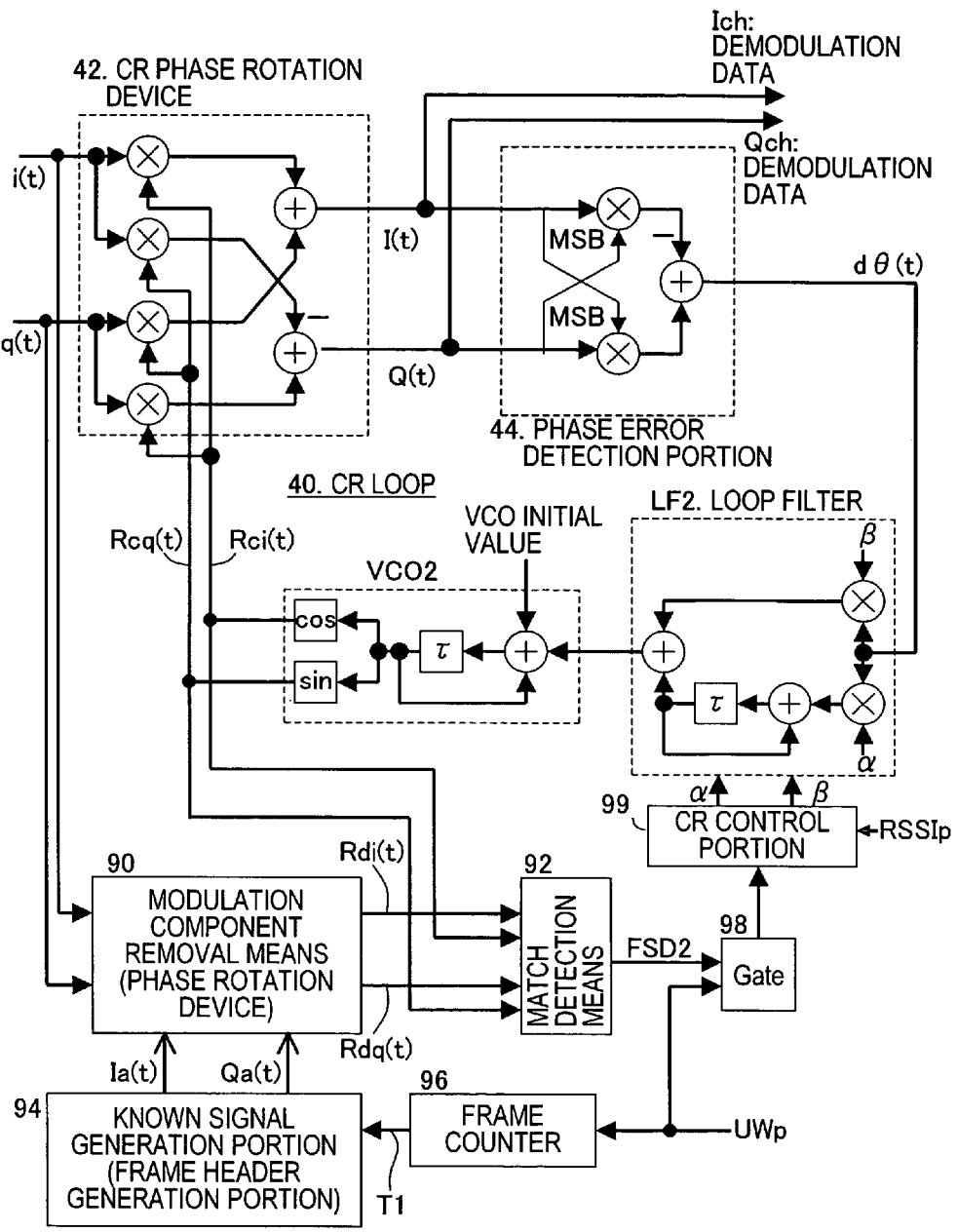
FIG. 13 shows phase synchronization detection means of a carrier recovery loop of this embodiment.

FIG. 13 shows phase synchronization detection unit of the carrier recovery loop of this embodiment. The CR loop 40 is constituted by a CR phase rotation device 42 for removing the phase error component, a phase error detection portion 44 for detecting the phase error dθ contained in the output of the CR phase rotation device 42, a loop filter LF2 and a voltage control oscillator VCO2. The CR phase rotation device 42 is constituted by four multipliers, an adder and a subtractor in the same way as the AFC phase rotation device 32. Further, the phase error detection portion 44 is a Costas-type phase discriminator here, is constituted by two multipliers and one subtractor, and detects the phase error dθ(t). Further, the phase error dθ is controlled to a feedback control value in accordance with the coefficients α and β by the loop filter LF2 and the corresponding CR reference signals Rci (t) and Rcq (t) are generated by the oscillator VCO2. Although there is a discrepancy between the phase error and frequency deviation, the operation of the CR loop 40 is the same as the operation of the AFC loop 30.

Therefore, the synchronous and asynchronous states of the CR loop can be detected based on the same principles as the AFC loop case. As a result, in the embodiment in FIG. 12, the modulation component removal means 90 remove the modulation component from the output signals i (t) and q (t) of the AFC phase rotation device 42 to generate the synchronous and asynchronous reference signals Rdi (t) and Rdq (t) and a match detection circuit 92 compares the synchronous and asynchronous reference signals Rdi (t) and Rdq (t) with the CR reference signals Rci (t) and Rcq (t) in the CR loop 40 and detects the synchronous and asynchronous states of the CR loop 40. If the CR loop 40 is in the synchronous state, the CR reference signals Rci (t) and Rcq (t) corresponding to the phase error component dθ (t) detected by the CR loop 40 is matched with the reference signals Rdi (t) and Rdq (t) generated by the modulation component removal means 90 and, if the CR loop 40 is in the asynchronous state, there is a mismatch. As a result, the match detection means 92 compare the signals and detect the synchronous and asynchronous states. A known signal generation portion 94 corresponds to the frame header generation portion 76 and the frame counter 96, gate circuit 98 and CR control portion 99 correspond to the frame counter 74, gate circuit 73 and control portion 68 in FIG. 8 respectively.

Modified Example of AFC Loop and CR Loop

The AFC loop 30 shown in FIG. 8 is controlled to the frequency locking operation state and to a steady state after a predetermined period by the AFC controller 68 in response to the RSSI pulse RSSIp. Further, when the asynchronous state is detected by the synchronous and asynchronous detection means after the steady state has been assumed, the AFC loop 30 is controlled to the frequency locking operation state in response to the synchronous and asynchronous signal FSD and is controlled to the steady state after a predetermined period. On the other hand, the AFC loop 30 may also be controlled to the locking operation state in response to only the results of the detection by the synchronous and asynchronous detection means instead of performing control with the RSSI pulse RSSIp. In such a case, every time when the frequency asynchronous state is detected, the AFC loop 30 starts the locking operation and is controlled to perform locking to the frequency synchronization state.

Similarly, the CR loop 40 shown in FIG. 13 is also controlled to the phase locking operation state and to the steady state after a predetermined period by a CR controller 99 in response to the RSSI pulse RSSIp. As described above, the CR loop 40 may be controlled to the locking operation state in response to only the results of detection by the synchronous and asynchronous detection means instead of control being performed with an RSSI pulse RSSIp.

What is claimed is:

1. A wireless reception device, comprising:
   an automatic frequency control unit which inputs a reception modulation signal that is frequency-converted to a baseband and is phase-modulated by information, and generates an automatic frequency control reference signal including a frequency deviation component of a carrier wave between transmission side and reception side that is contained in the reception modulation signal, the automatic frequency control unit having a frequency locking operation state and a steady state following the frequency locking operation;
   a modulation component removal unit which inputs the reception modulation signal, and generates a synchronization detection reference signal including the frequency deviation component by removing a phase-modulation component of the reception modulation signal from the reception modulation signal; and
   a match detection unit that detects a mismatch between the synchronization detection reference signal and the automatic frequency control reference signal,
   wherein, when the match detection unit detects the mismatch, the automatic frequency control unit is controlled to the frequency locking operation state.

2. The wireless reception device according to claim 1, wherein the modulation component removal unit generates the synchronous detection reference signal by removing a phase-modulation component corresponding to known information from a reception modulation signal that contains the known information.

3. The wireless reception device according to claim 1, wherein the modulation component removal unit removes the phase-modulation component by rotating a phase of the reception modulation signal containing known information on the basis of a known information signal containing the known information that is received.

4. The wireless reception device according to claim 1, wherein the reception modulation signal has a period that contains known information and a period that does not contain the known information, further comprising:
  known information signal generating unit which generates a known information signal containing a phase-modulation component corresponding to the known information while the reception modulation signal is in a period that contains the known information,
  wherein the modulation component removal unit removes the phase-modulation component by rotating the phase of the reception modulation signal containing the known information on the basis of the known information signal.

5. The wireless reception device according to claim 4, wherein the match detection unit detects a mismatch between the synchronous detection reference signal and the automatic frequency control reference signal while the reception modulation signal is in the period that contains the known information.

6. A wireless reception device, comprising:
  an automatic frequency control unit which inputs a reception modulation signal that is frequency-converted to a baseband, and generates an automatic frequency control reference signal including a frequency deviation component of a carrier wave between transmission side and reception side that is contained in the reception modulation signal, the automatic frequency control unit having a frequency locking operation state and a steady state following the frequency locking operation;
  a modulation component removal unit which inputs the reception modulation signal, and generates a synchronization detection reference signal including the frequency deviation component by removing a modulation component of the reception modulation signal from the reception modulation signal; and
  a match detection unit that detects a mismatch between the synchronization detection reference signal and the automatic frequency control reference signal,
  wherein, when the match detection unit detects the mismatch, the automatic frequency control unit is controlled to the frequency locking operation state,
  wherein the reception modulation signal is converted to a digital signal;
  the modulation component removal unit generates a sign bit of the synchronous detection reference signal from a sign bit of the digital reception modulation signal and a sign bit of a digital known information signal; and
  the match detection unit detects a mismatch between the sign bit of the synchronous detection reference signal and the sign bit of the automatic frequency control reference signal.

7. A wireless reception device, comprising:
  an automatic frequency control unit which inputs a reception modulation signal that is frequency-converted to a baseband, and generates an automatic frequency control reference signal including a frequency deviation component of a carrier wave between transmission side and reception side that is contained in the reception modulation signal, the automatic frequency control unit having a frequency locking operation state and a steady state following the frequency locking operation;
  a modulation component removal unit which inputs the reception modulation signal, and generates a synchronization detection reference signal including the frequency deviation component by removing a modulation component of the reception modulation signal from the reception modulation signal; and
  a match detection unit that detects a mismatch between the synchronization detection reference signal and the automatic frequency control reference signal,
  wherein, when the match detection unit detects the mismatch, the automatic frequency control unit is controlled to the frequency locking operation state,
  wherein the reception modulation signal is converted to a digital signal;
  the modulation component removal unit generates a digital synchronous detection reference signal by removing the modulation component of the reception modulation signal from the digital reception modulation signal; and
  the match detection unit detects a mismatch between the digital synchronous detection reference signal and a digital signal of the automatic frequency control reference signal.

8. The wireless reception device according to claim 1, wherein the automatic frequency control unit is controlled to the frequency locking operation state in response to start of reception of reception signal and to the steady operation state after a frequency locking operation state of a predetermined time and are further controlled to the frequency locking operation state in response to the detection of a mismatch by the match detection unit in the steady operation state.

9. The wireless reception device according to claim 1, wherein the automatic frequency control unit is controlled to the frequency locking operation state in response to the mismatch detection by the match detection unit and is controlled to the steady operation state after a frequency locking operation state of a predetermined time.

10. A wireless reception device, comprising:
  a carrier recovery unit which inputs a reception modulation signal that is frequency-converted to baseband and is phase-modulated by information, generates a carrier recovery reference signal including a phase error component of a carrier wave between transmission side and reception side that is contained in the reception modulation signal, and removes the phase error component from the reception modulation signal according to the carrier recovery reference signal, the carrier recovery unit having a phase locking operation state and a steady state following the phase locking operation;
  a modulation component removal unit which input the reception modulation signal, and generates a synchronization detection reference signal including the phase error component by removing a phase-modulation component of the reception modulation signal from the reception modulation signal; and
  a match detection unit that detects a mismatch between the synchronization detection reference signal and the carrier recovery reference signal,
  wherein, when the match detection unit detects the mismatch, the carrier recovery unit is controlled to the phase locking operation state.

11. The wireless reception device according to claim 10, wherein the modulation component removal unit generates the synchronous detection reference signal by removing a phase-modulation component corresponding to known information from a reception modulation signal that contains the known information.

12. The wireless reception device according to claim 10, wherein the modulation component removal unit removes the phase-modulation component by rotating a phase of the reception modulation signal containing known information on the basis of a known information signal containing the known information that is received.

13. The wireless reception device according to claim 10, wherein the reception modulation signal has a period that contains known information and a period that does not contain the known information, further comprising:
  known information signal generating unit which generates a known information signal containing a phase-modulation component corresponding to the known information while the reception modulation signal is in the period that contains the known information,
  wherein the modulation component removal unit removes the phase-modulation component by rotating the phase of the reception modulation signal containing the known information on the basis of the known information signal.

14. The wireless reception device according to claim 13, wherein the match detection unit detects a mismatch between the synchronous detection reference signal and the carrier recovery reference signal while the reception modulation signal is in the period that contains the known information.

15. A wireless reception device, comprising:
  a carrier recovery unit which inputs a reception modulation signal that is frequency-converted to baseband, generates a carrier recovery reference signal including a phase error component of a carrier wave between transmission side and reception side that is contained in the reception modulation signal, and removes the phase error component from the reception modulation signal according to the carrier recovery reference signal, the carrier recovery unit having a phase locking operation state and a steady state following the phase locking operation;
  a modulation component removal unit which inputs the reception modulation signal, and generates a synchronization detection reference signal including the phase error component by removing modulation component of the reception modulation signal from the reception modulation signal; and
  a match detection unit that detects a mismatch between the synchronization detection reference signal and the carrier recovery reference signal,
  wherein, when the match detection unit detects the mismatch, the carrier recovery unit is controlled to the phase locking operation state,
  wherein the reception modulation signal is converted to a digital signal;
  the modulation component removal unit generates a sign bit of the synchronous detection reference signal from a sign bit of the digital reception modulation signal and a sign bit of a digital known information signal; and
  the match detection unit detects a mismatch between the sign bit of the synchronous detection reference signal and the sign bit of the carrier recovery reference signal.

16. A wireless reception device, comprising:
  a carrier recovery unit which inputs a reception modulation signal that is frequency-converted to baseband, generates a carrier recovery reference signal including a phase error component of a carrier wave between transmission side and reception side that is contained in the reception modulation signal, and removes the phase error component from the reception modulation signal according to the carrier recovery reference signal, the carrier recovery unit having a phase locking operation state and a steady state following the phase locking operation;
  a modulation component removal unit which inputs the reception modulation signal, and generates a synchronization detection reference signal including the phase error component by removing modulation component of the reception modulation signal from the reception modulation signal; and
  a match detection unit that detects a mismatch between the synchronization detection reference signal and the carrier recovery reference signal,
  wherein, when the match detection unit detects the mismatch, the carrier recovery unit is controlled to the phase locking operation state,
  wherein the reception modulation signal is converted to a digital signal;
  the modulation component removal unit generates a digital synchronous detection reference signal by removing the modulation component of the reception modulation signal from the digital reception modulation signal; and
  the match detection unit detects a mismatch between the digital synchronous detection reference signal and a digital signal of the carrier recovery reference signal.

17. The wireless reception device according to claim 10, wherein the carrier recovery unit are controlled to the phase locking operation state in response to the start of reception of the reception signal and to the steady operation state after the phase locking operation state of a predetermined time and are further controlled to the phase locking operation state in response to the detection of a mismatch by the match detection means in the steady operation state.

18. The wireless reception device according to claim 10, wherein the carrier recovery unit is controlled to the phase locking operation state in response to the mismatch detection by the match detection unit and is controlled to the steady operation state after a phase locking operation state of a predetermined time.

19. A method for receiving a reception signal in a wireless reception device, comprising:
  converting a reception modulation signal, which is frequency-converted to a baseband, to a digital reception modulation signal;
  inputting the digital reception modulation signal to an automatic frequency control unit which has a frequency locking operation state and a steady state following the frequency locking operation;
  generating an automatic frequency control reference signal including a frequency deviation component of a carrier wave between transmission side and reception side that is contained in the digital reception modulation signal;
  inputting the digital reception modulation signal to a modulation component removal unit;
  generating a digital synchronization detection reference signal including the frequency deviation component by removing a modulation component of the reception modulation signal from the digital reception modulation signal;
  detecting a mismatch between the digital synchronization detection reference signal and a digital signal of the automatic frequency control reference signal; and
  controlling the automatic frequency control unit to the frequency locking operation state, when the match detection unit detects the mismatch.

* * * * *